Jan. 10, 1967   S. D. POOL ETAL   3,297,125
STATIC FRUIT CONVEYOR
Filed Aug. 28, 1964   2 Sheets-Sheet 1
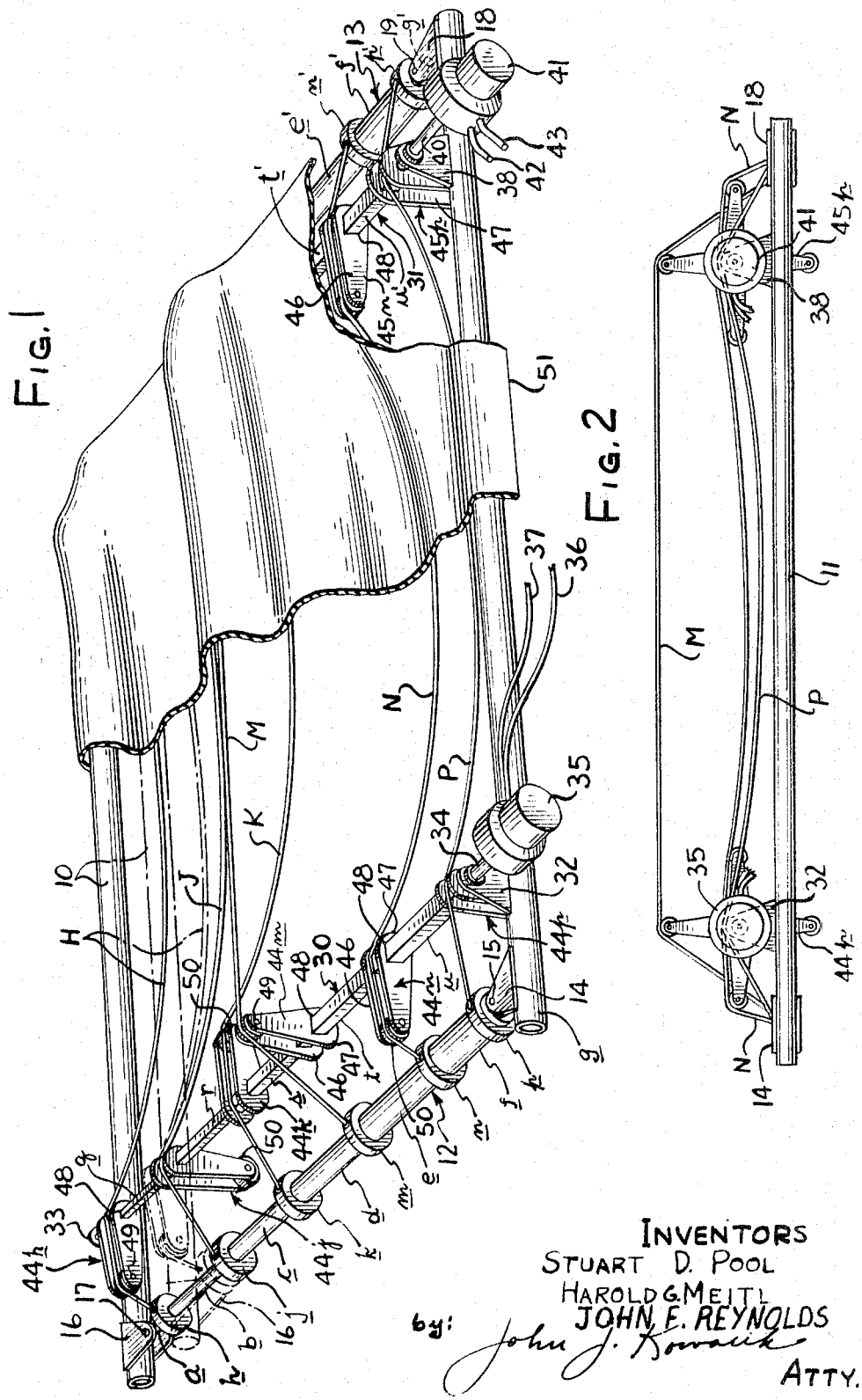
INVENTORS
STUART D. POOL
HAROLD G. MEITL
JOHN E. REYNOLDS
by: John J. Kowalik
ATTY.

Jan. 10, 1967  S. D. POOL ETAL  3,297,125
STATIC FRUIT CONVEYOR
Filed Aug. 28, 1964  2 Sheets-Sheet 2
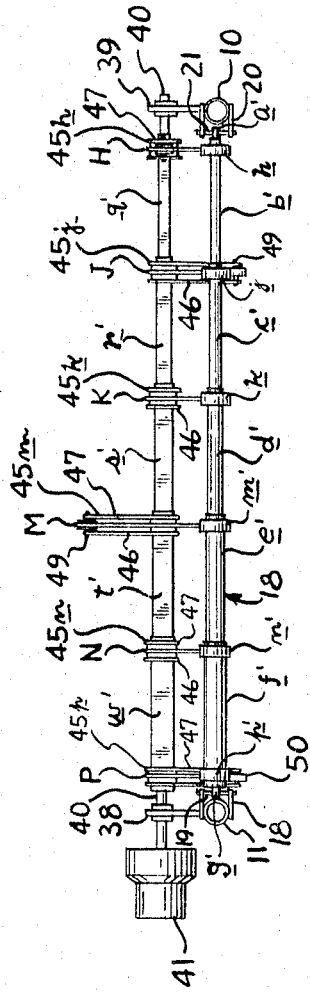
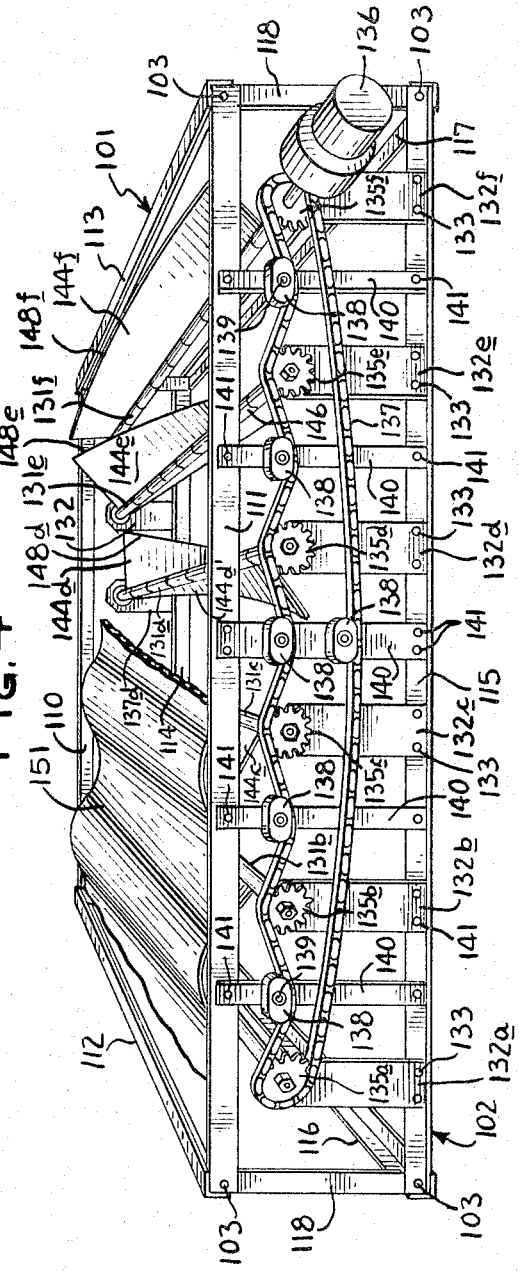
INVENTORS
STUART D. POOL
HAROLD G MEITL
JOHN F. REYNOLDS
by: John J. Nowack
ATTY.

United States Patent Office 3,297,125
Patented Jan. 10, 1967

3,297,125
STATIC FRUIT CONVEYOR
Stuart D. Pool, Naperville, Harold G. Meitl, Clarendon Hills, and John F. Reynolds, La Grange, Ill., assignors to International Harvester Company, Chicago, Ill., a corporation of Delaware
Filed Aug. 28, 1964, Ser. No. 392,849
7 Claims. (Cl. 198—1)

The instant invention relates to a static conveyor and the like. Particularly the invention relates to a method and static conveyor means for use in harvesting tree-grown crops, such as fruit and the like.

Commercial harvesting of tree-grown crops, besides by manual collection or gathering fruit or other vegetation which has naturally fallen, comprises shaking fruit or edible vegetation from trees into collecting devices or other devices from which the crops are conveyed to collecting devices.

Inherent in the nature of fruit harvesting, therefore, is the likelihood of damage to fruit by bruising because of the force of fall or the force of impact with which falling fruit hits a surface onto which it drops. While it is true that the fall impact force will vary according to a plurality of apparent physical conditions, nevertheless the likelihood of injury is great even under good harvesting conditions.

In the interest of improving harvesting results and the quality of yields, substantial effort has been expended in seeking means and methods to minimize impact damage. Prior to the instant invention, some headway had been made by employing impact force absorbing fabrics for catching falling crops. However, only part of the problem has been solved thereby.

The remainder defied ready solution because of inherent structural requirements for conventional equipment which have endless conveyors, the belts of which must be under tension as they are constantly being pulled or driven. That is to say, there is a level below which fall impact force cannot be reduced, even though impact absorbing fabrics are employed, as long as the catching surface is rigid or taut; and notwithstanding the use of catching surfaces fabricated from rubberized canvas on prior devices, sufficient impact injury to fruits occurs during harvesting that further improvement in processes and devices for additionally minimizing bruising during harvesting has been desired.

In accordance with the instant invention and as a primary object thereof, there is provided an improved method and means for catching and conveying fruit during harvesting which provide for improved dissipation of fall impact force over prior means and methods. To accomplish the foregoing, a static conveyor is employed. By using a static conveyor, of course, the requirement to tension the conveyor may be obviated because the conveyor is not pulled or dragged and does not move in the sense that the conventional endless type conveyor moves.

It is a further object of the invention to provide a method and means for harvesting fruit and the like using a static conveyor for catching and conveying the crop to a collection source and in which the conveyor is undulated to minimize fall impact force. By providing such undulating impact surfaces in a static conveyor, continuously yielding means are available upon which falling crop will land. The force dissipation by reason of undulating surfaces is substantially greater than that which is available either by permitting fruit and the like to fall to the ground or by catching it on a conventional type endless conveyor.

A still further object of the instant invention is the provision of means in the static conveyor for adjusting the direction of the undulations, whereby fruit and the like caught thereby can be directed in varying paths over the surface of the conveyor to accommodate fruit collection bins, baskets or the like in various positions with respect to the conveyor.

The desirability of portability in fruit harvesting devices stems from the need for movement from tree to tree. In accordance with such preferability and as a further feature of the instant invention, there is provided a device having an arrangement and combination of components which permit collapsing of the device. Additionally, the components, by reason of which the device is collapsible, permit the device to be partially reduced in size and yet operable as a conveyor, whereby the device is adapted for use under varying physical circumstances.

The device is further characterized by its simplicity of construction in which a plurality of cam-like members or undulators are disposed in horizontally spaced apart positions and rotate synchronously to create advancing waves in a loose fabric or bed to advance to a collection position fruits and the like which have fallen upon the bed.

These and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:

FIG. 1 is a rear perspective view of a device embodying one form of the invention, parts shown in dotted line and parts broken away for the purpose of illustration.

FIG. 2 is a rear elevational view of said device, the bed having been removed.

FIG. 3 is a side elevational view looking at the right side of FIG. 2.

FIG. 4 is a rear perspective view of a device embodying a modified form of the invention.

Referring now more particularly to the drawings, and having initially special reference to the form of the invention illustrated in FIGS. 1, 2 and 3, a static conveyor is shown. It comprises what may be called a front frame member 10 and a rear frame member 11. The frame members 10 and 11 are disposed parallel to each other and when in use occupy a plane which is substantially horizontal or at a slight angle from the horizontal with the front frame member 10 just a little lower than the rear frame member 11.

As illustrated in the drawings, frame members 10 and 11 may be of tubular construction. They are preferably fabricated of corrosive resistant steel or other suitable material.

A pair of substantially identical left and right side telescoping or collapsible frame members, generally designated by the numerals 12 and 13 respectively, are rigidly secured to the frame comprising members 10 and 11 in a manner which will hereinafter be described. Said side frame members 12 and 13 are disposed transversely of the front and rear frame members 10 and 11. Said side frame members 12 and 13 may be fabricated from corrosive resistant steel or other suitable material.

As illustrated in FIGS. 1 and 3, each side frame member 12 and 13 comprises a plurality of connected together sections. Those comprising the left side frame member 12 are identified by $a$, $b$, $c$, $d$, $e$, $f$ and $g$. Those comprising the right side frame member 13 are identified by $a'$, $b'$, $c'$, $d'$, $e'$, $f'$ and $g'$. The sections $a$ and $a'$ are disposed at the front end portion of the frame, while the side frame sections $g$ and $g'$ are disposed at the opposite end portion of the frame. Medially of said sections *a* and *g* and *a'* and *g'* the other sectons are disposed from front to rear according to alphabetical progression of the letters identifying said sections.

A pair of ears 14, the outer ends of which are rigidly secured on the left end portion of the rear frame member 11, extend inwardly of the frame in substantially parallel relationship. The rear end portion of the left frame section *g*, which is obscure in FIG. 1 because of the direction of the view, is rigidly secured between said ears 14 by means of a suitable fastener such as a pin or rivet 15, as illustrated in FIG. 1. Similarly, a pair of ears 16 the outer ends of which are rigidly secured to the left hand portion of the frame member 10 extend inwardly in spaced apart substantially parallel relationship. The front end portion of the section *a* is rigidly secured between said ears 16 by any suitable fastener such as a pin or rivet 17, as illustrated in FIG. 1. At the right side of the device, a pair of ears 18, the rear ends of which are rigidly secured to the right end portion of the frame member 11 by any suitable means, extend inwardly in spaced apart parallel relationship. The outer end portion of the right side section *g'* is anchored between said ears by any suitable fastener such as a rivet or the like 19. As illustrated to the right of FIG. 3, the outer end portions of a pair of ears 20 are rigidly secured to the right end portion of the frame member 10. The ears 20 extend inwardly of said frame in substantially parallel spaced apart relationship. Said ears 20 have anchored therebetween by means such as pin or rivet 21 the outer end portion of the right side section *a'*.

The left side sections *a, b, c, d, e, f* and *g* are axially coextensive on the left side of the frame, with the front and the rear sections *a* and *g* comprising the anchoring components for said side member 13 to the left side of frame members 10 and 11. The inner end portion of the frame sections *a* and *g* is rigidly secured to the outer end portion of the left side sections *b* and *f*, respectively.

The side sections *a', b', c', d', e', f'* and *g'* are axially coextensive, with the sections *a'* and *g'* comprising the anchoring sections whereby the side member 13 is secured in the frame. The inner ends of the sections *a'* and *g'* are rigidly secured by any suitable means to the outer end portions of side frame sections *b'* and *f'* respectively.

The left side sections *b, c, d, e* and *f*, as well as the right side sections *b', c', d', e'* and *f'*, may be telescopically or collapsibly connected together in a manner illustrated. In FIGS. 1, 2 and 3, the sections *b* through *f* and *b'* through *f'* are short tubular components of decreasing diameter from the rear to the front. By reason of the foregoing construction, it is now apparent that the frame may be readily and easily collapsed by causing the front frame member 10 and the rear frame member 11 to be moved toward each other. In the upper portion of FIG. 1, a partially collapsed position is shown in dotted lines.

The collapsible left frame member 12 has rigidly secured thereto a plurality of collars or anchoring members *h, j, k, m, n,* and *p*. In FIG. 1, the collar *p* is shown in dotted lines inasmuch as it is otherwise obscured by the angle of the drawing. The collars or anchoring members *h, j, k, m, n* and *p* are disposed in spaced apart relationship longitudinally on the left side member 12. A plurality of like collars or anchoring members *h', j', k', m', n'* and *p'* are secured rigidly in spaced apart relationship on, and longitudinally of right frame member 13. The collars or anchoring members *h, j, k, m, n* and *p* are disposed laterally of collars or anchoring members *h', j', k', m', n'* and *p'*, respectively, with which they are respectively in operative alignment.

An elongated cable H has its opposite ends rigidly anchored to the collars or anchoring members *h* and *h'*. An elongated cable J has its opposite ends rigidly secured or anchored on the anchoring members or collars *j* and *j'*. An elongated cable K has its opposite ends rigidly secured to collars or anchoring members *k* and *k'*. An elongated cable M has its opposite ends rigidly secured to the collars or anchoring members *m* and *m'*. An elongated cable N has its opposite ends rigidly secured to the collars or anchoring members *n* and *n'*; and elongated cable P has its opposite ends rigidly secured to the collars or anchoring members *p* and *p'*.

Accordingly, the cables H, J, K, M, N and P are spaced apart and parallel to each other. They are also longer than the respective linear distances between their anchored ends, by reason of which there is a normal slack which exists in the cables.

A pair of elongated collapsible or telescopic rods or shafts, generally designated by the numerals 30 and 31, are rotatably mounted on opposite side portions of the frame. To effectuate the mounting of rod 30 on the left side of the device, a pair of spaced apart journalling stands 32 and 33 have their lower end portions rigidly connected to the frame members 10 and 11 in aligned positions. The opposite end portions 34 of the rod 30 are journaled in the upper end portion of stands 32 and 33. An hydraulic motor 35 operably connected to one end portion 34 and having customary fluid inlet and outlet lines 36 and 37, only a portion of which are shown in FIG. 1, may provide the means for driving the rod or shaft 30.

On the right side of the frame, the lower ends of journalling stands 38 and 39 are rigidly secured to the left side portions of front and rear frame members 10 and 11 by any suitable means. Said journalling stands 38 and 39 are disposed in aligned positions and in their upper end portions support the opposite end portions 40 of rod or shaft 31. An hydraulic motor 41 operatively connected to one of the end portions 40 and having customary fluid inlet and outlet lines or conduits 42 and 43 may be operably connected to the drive rod or shaft 31.

Additionally, rods 30 and 31 extend transversely of frame members 10 and 11 in parallel relation to side members 12 and 13. However, said rods 30 and 31 are disposed inwardly of the side frame members 12 and 13, and lie in a plane which is disposed above and parallel to the plane of the frame members 10 and 11.

Each of the rods 30 and 31 comprises a plurality of connected together sections medial of their respective end portions 34 and 40. Said sections *q, r, s, t* and *u* of the rod 30 correspond to the sections *q', r', s', t'* and *u'* of the rod 31. The respective rod sections are telescopically connected together, having a progression of size from smaller to larger according to the alphabetical progression of their identifications and also in the direction which the frame member 11 has from frame member 10. Thereby, as the frame collapses, the rod members 30 and 31 will also collapse.

It is seen that the sections of the rods or shafts 30 and 31 are rectangular in cross section to provide for mounting of a plurality of cams or agitators. The cams or agitators on the left side of the device are mounted on the shaft or rod 30 and are identified generally by the numeral 44. However, each agitator or cam 44 is further identified according to a cable with which each is associated, by applying, in the drawings, adjacent each numeral 44, a lower case letter corresponding to the upper case letter designating its associated cable. Accordingly, agitators or cams 44 are individually identified as 44*h*, 44*j*, 44*k*, 44*m*, 44*n* and 44*p*.

On the opposite side of the device and mounted on the elongated rod or shaft 31, are a plurality of agitators or cams generally designated by the numeral 45. Each of the cams or agitators 45 is further identified by a cable with which each is associated by applying, in the drawings, adjacent each numeral 45, a lower case letter corresponding to the upper case letter designating its respective cable. Therefore, such agitators or cams are identified individually as 45*h*, 45*j*, 45*k*, 45*m*, 45*n* and 45*p*.

By having reference to the drawings, it is observed that each of the cables together with its pair of opposite or laterally spaced apart agitators or cams comprises an undulating unit. That is to say, agitators or cams 44h, 45h and the cable H, comprise an undulating unit, and cams or agitators 44j, 45j and the cable J comprise another undulating unit, and so on. In all, in the particular embodiment illustrated in FIGS. 1, 2 and 3, six undulating units are shown for a purpose to become hereinafter apparent.

Reference is now had to the details of construction of the cams or agitators 44 and 45. Each thereof may be identical to the other in construction. Each of the agitators or cams 44 and 45 comprises a pair of arms 46 and 47, only some of which have been labeled in the drawings. The arms 46 and 47 of each pair are spaced parallel to each other and in such pairs extend radially from the axis of rotation of the shafts or rods 30 and 31 on which they are mounted.

At its central end each of the arms 46 and 47 is provided with a rectangular aperture or opening 48, only some of which have been identified in the drawings. The dimensions of the apertures or openings 48 are substantially the same as the dimensions to the exterior of the sections of the telescopic rods 30 and 31 on which said arms 46 and 47 are mounted. Said openings or apertures 48 are on the inner end portions of their respective arms 46 and 47, and provide the means whereby said cams or agitators 44 and 45 may be anchored on respective of the rods 30 and 31 and may be locked from rotation independently thereof.

The arms 46 and 47 of each pair thereof, that is to say each of the agitators or cams 44 and 45 has mounted on its outer end portion by means such as an axle pin or the like 49, only some of which have been identified in the drawings, a small rotatable roll, roller or idler 50, only some of which are identified on the drawings. As illustrated in the drawings, each of the idlers or rollers 50 provides a bearing for one end portion of its respective cable as such cable is being tensioned.

A conveyor bed 51 comprising a wide sheet, drape or web section which may be fabricated from a suitable impact absorbing material such as rubberized canvas, extends over the entire framework of the device. Said bed 51 is disposed above the cables H, J, K, M, N and P. The bed 51, only a portion of which is shown in FIG. 1, may be loosely draped without fasteners to hold down the end portions thereof. If desired, the end portions of bed 51 may be anchored, provided that the desired fullness is present to accommodate the undulating movement which will hereinafter be described.

Having thus described the details of construction of the embodiment shown in FIGS. 1, 2 and 3, a brief description of operation of the device ensues:

Now, the device as previously indicated is collapsible by reason of the telescopic construction of the frame members 13 and 14 and the transversely extending shafts or rods 30 and 31, whereby the device may be easily transported from one site or location to another. In use, the conveyor may be supported at a slight angle on a suitable framework or standard (not shown) and carried on a wagon or other truck flat, and, within a given orchard, moved from tree to tree.

When fruit drops on the bed 51 of the conveyor, it will be met by an undulating surface which continuously moves in successive waves. Such undulating movement is caused by rotation of the shafts or rods 30 and 31 which may be driven, as illustrated in FIGS. 1, 2 and 3, by motors 35 and 41. The shafts or rods 30 and 31 carry agitators or cams 44 and 45. As the cams 44 and 45 rotate about their axes of rotation formed by rods or shafts 30 and 31, they successively tension and release tension from the cables H, J, K, M, N and P, respectively.

In the particular embodiment which is shown in FIGS. 1, 2 and 3, each of the cams or agitators 44 and 45 can be mounted in four positions on its respective of the square rods or shafts 30 and 31. Each setting or mounting is 90° from the other by reason of the configuration of apertures 48 in which said rods 31 and 32 are disposed to lock said cams or agitators 44 and 45 from rotation independently of said rods or shafts 30 and 31. In FIGS. 1, 2 and 3, the cams or agitators 44 and 45 have been mounted on their respective shafts 30 and 31 so that the cams or agitators of each undulating unit will be in the same degree of rotation at the same time. Thereby, each wave will be substantially parallel to the frame members 10 and 11.

Furthermore, inasmuch as there are six undulating units shown, two thereof will be in substantially the same position as two others thereof, at the same time. That is to say, the undulating unit embodying cable P and the unit embodying the cable J will be at their nadirs as well as other equivalent positions, such as cresting, at the same time. Similarly, undulating units embodying cables N and H are in the same wave positions at the same time.

It is additionally noted that each of the cams or agitators 44 and 45 is 90° clockwise from the adjacent thereof toward frame member 10. By reason thereof two uniformly moving waves will travel across bed 51. The undulating waves of course will advance the fallen fruit.

In addition, the undulations which convey the fruit also provide characteristics which make bed 51 more shock-absorbent than a movable conveyor bed or endless conveyor of the same fabrication. That is to say, when bed 51 is yielding, full force of falling fruit will not be concentrated on the fruit surface at the time of impact. During those periods in which the bed 51 is not yielding but rather rising to a crest, it will cause falling fruit coming in contact therewith to slide gently down a slope, and thereby gradually dissipate the force of the fall.

It is appreciated that the rectangular shape of the openings or apertures 48 as well as the square cross sectional configuration of the cam rods 30 and 31 limit the settings of cams or agitators 44 and 45 to four positions. However, attention is invited to the fact that the rods 30 and 31, and accordingly the shape of the apertures or openings 48, could be of any desired configuration to facilitate a greater variety of relative settings of the cams 44 and 45. That is to say, for example, the sections of the rods 30 and 31 could be made hexagonal in cross section with corresponding hexagonal apertures in the cams 44 and 45. Thereby, six possible settings would be available for each of the cams or agitators 44 and 45 whereby a more gentle wave could be procured.

It is further observed that with the setting of the cams or agitators 44 and 45, as illustrated in the drawings, the undulations will appear in the form of waves which extend laterally of the frame parallel to the frame members 10 and 11. That is by reason of the fact that the cams or agitators 44 and 45 of each undulating unit are positioned to cause simultaneous tensioning of both ends of respective cables. However, by providing a variation in the settings of the cams or agitators 44 and 45 of each undulating member, undulating waves may be formed which are disposed angularly to the frame members 10 and 11, as is apparent by referring to the drawings.

The synchronization of the movement of moving parts of the device is such that the undulations of the static conveyor will carry fruit on bed 51 to the edge from which it can drop by gravity into a basket or other suitable container, not shown.

A modified form of the invention is seen in FIG. 4. Having reference thereto, it is seen that the embodiment of the modified form may include a rigid structure comprising an upper substantially rectangular framework generally designated 101. Upper framework is defined by upper front frame member 110, a rear front frame member 111 spaced in parallel relationship to the frame member 110, a left upper right angular frame member 112 and a right upper right angular frame member 113. The upper frame member 101 may be considered as disposed substantially within a single plane.

The rigid structure of the modified form also comprises a rectangular lower framework generally designated by the numeral 102 which is substantially rectangular in shape. Framework 102 may be considered as lying substantially within a single plane parallel to superposed framework 101. Said lower framework 102 comprises a lower front component 114, a lower rear component 115, a left side right angular component 116, and a right side right angular component 117.

Components or members comprising framework 102 are connected together in any suitable fashion, as are the components or frame members comprising the framework 101. One method may be, as illustrated in FIG. 4, by providing corner right angular ties 118 which extend vertically and are disposed at the corners of the frameworks 101 and 102. The opposite ends of said ties 118 are connected respectively to the ends of the members or components of the upper and lower frameworks 101 and 102 by means which may include fasteners 103.

A rigid framework is thereby provided which will support a plurality of rotatable driven shafts 131a, 131b, 131c, 131d, 131e, and 131f. The letters in lower case are added to the numeral 131 in FIG. 4 for the purpose of distinguishing one shaft from the other. However, when said shafts are generally referred to they will be designated by the numeral 131 notwithstanding the fact such numeral does not appear alone in the drawings but always in connection with a lower case letter.

A like procedure will be used in identifying other structures. That is, a numeral will identify a class of components while the lower case letter added to such numeral will distinguish within the class. Furthermore, all numerals with the same letter designation will refer to somehow associated structures, the nature of the association of which will be apparent.

Shafts 131 are mounted in the framework in parallel relationship to each other. They extend from the front to the back of the framework of the device. A plurality of oppositely disposed arms or supports 132 extends upwardly from each lower frame member 114 and 115 to support shafts 131, respectively. To distinguish further the upwardly extending support members 132 one from the other, their numerals of identification have letters a–f added according to the shafts 131 which they support. Accordingly, the two supports 132a (one of each extending from each of the lower frame members 114 and 115) support opposite ends of shaft 131a. Additionally, the two supports 132b in a like fashion extend upwardly from opposite ends of the framework to support the shaft 131b, and so on.

The lower end portions of the respective support members 132 are fastened to the lower frame members 114 and 115 by fasteners 133, such as rivets or bolts or the like, only certain of which have been identified in FIG. 4. The opposite ends of the shafts 131a–131f are journalled in the upper end portions of their respective pairs of opposite supports 132a–132f, respectively.

The rear end portions of the shafts 131 extend rearwardly of their respective supports 132. Beyond the rear end of the frame, a sprocket or the like 135 is secured to each shaft 131 in any suitable fashion well known in the art. Following the manner of designating the components herein, the sprockets 135 are further defined in the drawings by the appendment to the numerals of letters a through f, designating the respective shaft with which each is associated.

An hydraulic motor 136 may be operably connected to or mounted on a rearward end portion of shaft 131f to rotatably drive said shaft 131f. An endless chain 137 extending about the sprocket wheels 135 drives said sprocket wheels 135. Accordingly, the shafts 131 rotate simultaneously.

A plurality of rotatable cams, bosses or chain-tighteners 138 bear against the sprocket chain 137 whereby slack is removed from said chain. That is to say, the chain is kept under the proper tautness effieciently to drive the shafts 131. The cams, bosses or chain-tighteners 138 are rotatably mounted on pins or the like 139, only some of which have been numbered in the drawings. Said bosses or cams 138 are releasably secured in adjusted positions of rotation by any suitable means known to those skilled in the art. The pins 139 are mounted in vertically extending slats 140, and said slats 140 are secured at their opposite end portions by rivets and the like 141 to the upper and lower frameworks 101 and 102 in the manner illustrated in FIG. 4.

By having reference to FIG. 4, it is seen that the various shafts 131 are disposed below the plane of the upper framework 101. The inner or central end portions of a plurality of paddles, fins, agitators or undulating components 144 are rigidly secured to each of the shafts 131. The paddles, agitators or undulating components 144 are differentiated from each other by the appendment to said numeral 144, in FIG. 4, of lower case letter designations corresponding to the letter designations of the shafts with which said paddles, agitators or undulating components 144 are associated. One-half of said paddles, agitators or undulating members 144 are differentiated from the other half by the appendment to their identifying indicia of a prime (') mark. That is to say, for example, the paddles, agitators or undulating components on the shaft 131d are identified as 144d and 144d', respectively. Only a part of the fins or undulating members 144 are marked or identified because they are obscured in the drawing or the application of the indicia would tend to crowd the figure.

Referring now to the fins, paddles, agitator or undulating components 144, is is observed that each extends radially from its respective shaft. Additionally, said fins, paddles, agitators or undulating members 144 lie within a surface which is curved or twisted arcuately radially as well as curved or twisted longitudinally of its respective shaft 131. Furthermore, it is noted that at their greatest linear distance from their respective shafts 131, said members 144 will be rotated above the plane of the upper framework 101.

Another characteristic of significance is found in the outer edges of selected of undulating components 144. They extend angularly toward their respective shafts from their respective high positions. In this regard, attention is invited to FIG. 4 in which it is seen that the paddle, fin or undulating member 144f has an outer edge 148f which remains a substantially constant distance from its respective shaft 131f. On the other hand, the edge 148e of its corresponding agitator, fin or undulating member 144e slopes inwardly toward its shaft 131e, as well as does the edge 148d of the undulating component 144d.

In this latter regard, attention is invited to the variation in the degree of inclination of the edges 148e and 148d. The inclination of such edges 148 can be made to vary in accordance with the ultimate undulating effect which is desired.

The bed, sheet or drape 151, which is of flexible, impact absorbing fabrication, such as rubberized canvas or the like, is disposed above the framework 101 in a manner that the medial portions of said sheet 151 are supported by the shafts 131 and the fins, paddles or undulating components 144 mounted on said shafts. Now, of course, as the shafts 131 rotate, and undulating motion is set up in the sheet or bed 151.

The nature of the motion and direction of the waves will be dependent upon the disposition and configuration of the undulating members 144. By appropriate inclination of the edges 148 and curving of the paddles, fins or undulating members 144, an undulant movement can be set up in the sheet or bed 151 which will direct fruit, which has fallen or is postioned on said sheet, in any desired path across the bed or sheet 151.

It is appreciated that in usual use, the conveyor device shown in FIG. 4 may be mounted on a supporting carrier or base. Said conveyor device, as well as that shown in FIGS. 1, 2 and 3, may be tilted slightly to facilitate dropping off of fruit and the like from their undulating beds.

As many substitutions or changes could be made in the above described construction and process, and as many apparently widely different embodiments of the invention within the scope of the claims could be constructed without departing from the spirit and scope thereof, it is intended that all matter contained in the accompanying specification shall be interpreted as being illustrative and not in a limiting sense.

We claim:

1. A static conveyor for conveying fruit and the like comprising means providing a frame; means providing a bed on said frame, and means for undulating said bed comprising a plurality of wave producing members carried on said frame below said bed, means for moving said members, said each member including a shaft, and agitators which lie in surfaces which are curved longitudinally and radially of said shaft, and the outer edge of each of said agitators sloping with respect to its mounting shaft inwardly from its outermost position at an angle different from the others.

2. A static conveyor for conveying fruit and the like comprising means providing a frame including end portions and side portions; means providing a bed on said frame, and means for undulating said bed comprising a plurality of wave producing members carried on said frame below said bed, means for moving said wave producing members comprising
    pairs of cam-like members rotatably mounted on opposite side portions of said frame, and
    cables draped upon said cam-like members and extending from one of said end portions to the other in underposed relation to said bed.

3. The static conveyor defined in claim 2 in which said cables have opposite end portions secured to said frame, said cam-like members rotatable against said cables intermediately of said secured end portions thereof.

4. A static fruit conveyor for catching falling fruit and the like, and thereafter conveying the same, comprising
    a collapsible frame;
    collapsible rotatable shaft means carried on said frame;
    driven cam-like members operably connected to said shaft means;
    prime mover means for driving said shaft, and
    a flexible bed onto which fruit will fall means supporting said bed and operably engaging said cam-like members
wherby said bed undulates to convey such fallen fruit.

5. A static conveyor and the like for catching falling fruit and thereafter convey the same and comprising
    a collapsible frame;
    a pair of collapsible parallel shafts journalled on opposite side portions of said frame;
    a plurality of parallel cables disposed transversely of said shafts,
        the opposite ends of said cables secured to said frame;
    a plurality of cams secured to said shafts beneath said cables;
    means for driving said shafts, and
    a flexible bed draped over said cables and movable thereby therein to provide undulations to convey thereacross fruit on said bed.

6. The static conveyor defined in claim 4 further characterized by means for varying the direction of the undulations.

7. The device of claim 6 in which each of said cam-like members includes
    an eccentrically apertured arm,
        said shaft disposed in said arm aperture,
        said arm adjustably secured in selected positions of rotation on said shaft, and
    a cable extended over associated pairs of arms and movable up and down thereby,
    said bed supported by said cables whereby the direction of undulations in the bed can be adjusted.

References Cited by the Examiner

UNITED STATES PATENTS

| | | | |
|---|---|---|---|
| 1,783,700 | 12/1930 | Byington | 198—213 |
| 1,958,322 | 5/1934 | Symington | 198—1 |
| 2,840,090 | 6/1958 | Bradford | 198—30 |

EVON C. BLUNK, *Primary Examiner.*

RICHARD E. AEGERTER, *Examiner.*